United States Patent [19]
Budelman et al.

[11] Patent Number: 5,819,027
[45] Date of Patent: Oct. 6, 1998

[54] BUS PATCHER

[75] Inventors: Gerald A. Budelman, Portland; William A. Hobbs, Beaverton; Stephen J. Peters, Aloha, all of Oreg.; Tsvika Kurts, Haifa, Israel; Nitin V. Sarangdhar, Portland; Kenneth B. Oliver, Hillsboro, both of Oreg.

[73] Assignee: Intel Corporation, Santa Clara, Calif.

[21] Appl. No.: 607,943

[22] Filed: Feb. 28, 1996

[51] Int. Cl.⁶ .................................................. G06F 11/00
[52] U.S. Cl. ................ 395/184.01; 395/181; 395/183.15
[58] Field of Search ......................... 395/183.15, 183.19, 395/184.01, 473, 280, 181, 183.01

[56] References Cited

U.S. PATENT DOCUMENTS

| | | | |
|---|---|---|---|
| 5,142,673 | 8/1992 | De Angelis et al. ............... | 395/183.15 |
| 5,220,662 | 6/1993 | Lipton ................................. | 395/183.15 |
| 5,271,020 | 12/1993 | Marisetty ............................... | 371/37.1 |
| 5,535,345 | 7/1996 | Fisch et al. ............................. | 395/309 |
| 5,546,546 | 8/1996 | Bell et al. ............................... | 395/292 |
| 5,548,733 | 8/1996 | Sarangdhar et al. ..................... | 395/286 |
| 5,555,372 | 9/1996 | Tetreault et al. .................... | 395/182.13 |
| 5,555,382 | 9/1996 | Thaller et al. .......................... | 395/293 |
| 5,621,900 | 4/1997 | Lane et al. .............................. | 395/300 |

*Primary Examiner*—Albert Decady
*Attorney, Agent, or Firm*—Blakely, Sokoloff, Taylor & Zafman

[57] ABSTRACT

An apparatus including a protocol watcher adapted for use with a bus, a state machine adapted to detect known bug signatures on the bus, and a perturber adapted to intervene on the bus to prevent occurrence of bugs having those signatures. A system utilizing such includes a bus, a first agent coupled to the bus, a second agent coupled to the bus for communicating to the first agent according to a bus protocol, and the bus patcher coupled to the bus for monitoring a communication from the second agent to the first agent to identify an event which would cause an error in the apparatus, and for modifying the communication such that the event is avoided. Any of the protocol watcher, state machine, and/or perturber may be programmable.

42 Claims, 6 Drawing Sheets

BUS PATCHER

BACKGROUND OF THE INVENTION

1. Field of the Invention

The present invention relates generally to improvements in bus communications systems. More specifically, the invention relates to a method and apparatus for preventing errors from occurring in a computer system, by the addition to the system of a patcher which monitors the bus for the occurrence of a bus event which would potentially cause an error in the system, and which then interferes with the normal bus behavior, thereby preventing that event from occurring or being observed by other agents on the bus.

2. Background of the Prior Art

Computer systems or other logic systems may include components or combinations of elements which are subject to various failure mechanisms upon the occurrence of a particular set of conditions. Each such condition may be termed a "bug". Each bug has a "bug signature", which defines the set of circumstances which will cause the occurrence of the bug.

For example, a system component may fault when a first particular event is followed immediately by a second particular event, but will not fault if any other event occurs between the first and second. Or, a first component may change behavior or perhaps even crash when a second component issues a particular event when the first component is in a specific state. Such failure mechanisms are well known in the art.

In computer systems or other logic or communications systems, generally referred to as computer systems hereinafter, various of these bug signatures may center around events occurring on a bus which connects a plurality of agents. For example, a computer system may include a processor, a chipset, and other agents, all coupled together by a system bus. It is well understood that there may exist bug signatures which involve particular communications between these agents over the bus.

Alternatively, bug signatures may exist within a more compact universe, in which a particular event or series of conditions wholly within a single chip or other agent may cause an internal or external error. These sorts of bugs may involve a plurality of functional units coupled together by an intra-chip bus, or they may even involve a sequence of states within a single unit.

Previously, logic analyzers and in-circuit emulators have been utilized to monitor computer bus traffic to determine the source and cause of an observed system error. Unfortunately, these tools only provide information which can be used to make a re-definition and re-manufacture (a new stepping) of the component having the bug, so that this new stepping of the component will not exhibit the bug. They cannot be used to prevent occurrence of the bug in existing components.

Also, it is well understood that particular kinds of "blocking bugs" may "hide" other bugs. The hidden bugs only occur, and can only be discovered for fixing, once the blocking bugs are fixed. Or, they may occur infrequently enough that they may be masked by other bugs. If there are a series of these blocking bugs, the use of mere logic analyzers and in-circuit emulators may require a large number of steppings to achieve a functionally correct, bug-free component. This may cost a significant amount of time, money, and engineering effort. Finally, the logic analyzers and in-circuit emulators tend to be large and expensive, and are wholly inappropriate for use in fixing bugs in a large number of installed systems on an ongoing run-time basis.

It is, therefore, desirable to have an improved means for detecting the occurrence, or impending occurrence, of a bug, according to its bug signature, and for preventing the bug from occurring. It is desirable that this not require a stepping of the component. It is further desirable that this be inexpensive to implement in production quantity components. It is also desirable that it be programmable, so that it may be used to fix later-discovered bugs in an installed base of systems.

SUMMARY OF THE INVENTION

The present invention encompasses an apparatus which includes a bus, a first agent coupled to the bus, a second agent coupled to the bus for communicating to the first agent according to a bus protocol, and a patcher coupled to the bus for monitoring a communication from the second agent to the first agent to identify an event which would cause an error in the apparatus, and for modifying the communication such that the error is avoided. The invention also encompasses the method of operation of such an apparatus and of such a bus patcher.

The bus patcher includes a protocol watcher which is adapted for use with the bus, a state machine which is adapted to watch for the occurrence of known bug signatures on the bus, and a perturber which is adapted for intervening on the bus to prevent occurrence of the bugs which have those signatures. Any of the protocol watcher, state machine, and/or perturber may be programmable.

The bus patcher can be used during silicon debug to avoid blocking bugs and find bugs hiding behind them, to permit the blocking and hidden bugs to be fixed in fewer steppings of the silicon.

DETAILED DESCRIPTION OF THE INVENTION

Figure 1:
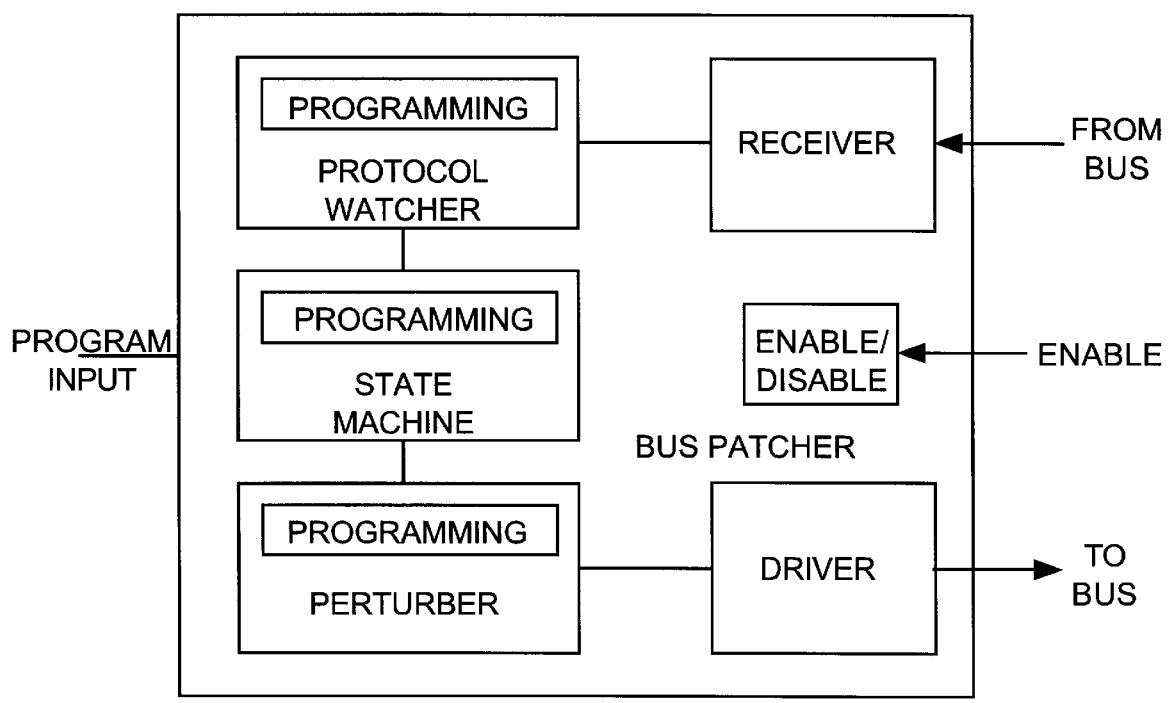
FIG. 1 is a block diagram of the main components of the bus patcher.

FIG. 1 illustrates one embodiment of the bus patcher of the present invention. The bus patcher includes a receiver for coupling to the bus or component which exhibits a bug. In one embodiment, the receiver is for coupling the bus patcher to a system bus or processor bus of a computer system.

It is well understood that the various components in a computer system may advantageously utilize a pre-defined bus protocol for signaling each other over the bus. Therefore, the bus patcher includes a protocol watcher coupled to the receiver, which monitors the signals, events, transactions, or other elements of the protocol as manifested on the bus.

The bus patcher further includes a state machine or other logic means, coupled to the protocol watcher. The state machine has knowledge of the bug signatures of bugs to be patched and thereby avoided.

A perturber is coupled to, and is responsive to, the state machine. Upon the recognition by the state machine of the occurrence or impending occurrence of a bug according to the bug's signature, the perturber takes appropriate action to avoid the bug. The perturber is coupled through a driver back to the computer system bus.

Any of the basic elements of the bus patcher may be programmable. To be programmable, an element may include a programming means such as a field programmable gate array, a programmable array logic, a programmable logic array, an application specific integrated circuit, a read-only memory, a random access memory, or other suitable programmable device. In embodiments in which one or more of the elements is programmable, the bus patcher includes program input means for accepting a program. For example, the bus patcher may use a JTAG scan chain, a dedicated I/O port, the bus itself, or other suitable means to receive the programming information.

Alternatively, hard-coded logic may be used, if it is not required that the elements be programmable.

The protocol watcher may include a programming means, if it is desired to make the bus patcher operate with a bus protocol which is subject to change, or if the bus patcher is required to operate with two or more types of computer systems which have different buses.

It is even more desirable that the state machine include programming means, to determine which bug signatures will be patched. By entering additional bug signatures into the programming means of the state machine, the bus patcher will be enabled to watch for and prevent additional bugs. This will enable the bus patcher to be field upgraded when new bugs are discovered. It will also enable the bus patcher to be customized according to the particular system into which it is installed. For example, an application program could determine an identification of the system, and selectably load particular bug signatures accordingly.

Finally, the perturber may include a programming means. This will permit re-definition of the action to be taken upon the detection of a particular bug, and the addition of new actions upon the discovery of new bug signatures. The state machine and perturber may generally be upgraded or re-programmed in tandem, because a bug signature and the action to be taken to prevent its occurrence will typically be a pair.

In one embodiment, the programmability of both the bug signatures and perturbation actions may be commonly stored in a single component, for example the state machine. In various embodiments, the state machine and the perturber may be implemented as a single element, or either may be implemented as a sub-component of the other.

It will be appreciated that the more complete the bus patcher's knowledge concerning the total system, the more robust will be the bus patcher's ability to prevent bugs. For example, it may be desirable that the bus patcher is provided with complete information concerning the computer system's address mappings. This would enable the bus patcher to catch system-dependent bugs. In addition, it may be desirable that the bus patcher will have information about the I/O bus (such as a PCI bus).

It may further enable the patcher to avoid unnecessary patching by recognizing bug signatures at a finer granularity. As an example, a bug may occur upon the sequential issuance of two bus transactions having a particular attribute, but only in the case where they come from the same agent. By having this additional information, that the bug only occurs when the same agent issues the two transactions, the bus patcher will be able to avoid patching when the two transactions come from different agents. This unnecessary patching may have resulted in nothing more harmful than slight system performance degradation, or it might have actually caused an error, crash, or hang.

The programming information may include, for example, which bus lines, events, or transactions to watch, particular data values to monitor, predefined address mappings, particular sequences of events, certain outputs or results, or the like. These define the bug signature. It will be appreciated that bug signatures may include a wide variety of data, conditions, states, events, and the like.

The perturbations may likewise include a wide variety of actions. Generally, they may involve the bus protocol, bus pipelining, system electricals, direct communications to agents, I/O bus, sideband signals, or the like.

Examples of bus protocol perturbations include: delaying a bus signal or transaction for a period of time such as a predefined number of clocks, asserting or deasserting a signal, extending bus cycles, interrupting bus arbitration, canceling a completed transaction, issuing an interrupt, or even issuing a reset signal to restart the entire computer, or other such valid use of the bus protocol itself. In these cases, the perturbation is done within the confines of the bus protocol, to maintain system integrity and determinism.

Alternatively, the perturbation may involve a violation of the bus protocol. Examples include: issuing a signal at a prohibited time, issuing a signal in a prohibited combination with respect to other signals, or the like. In general, such violative perturbations are less desirable than those which are within the bus protocol, because they offer lesser determinism and greater possibility for actually creating an error.

Some perturbations which violate the bus protocol may be acceptable, however, if they violate it in a way that produces known results from which the system can recover. For example, forcing a parity error by changing the value of a single data signal or bit line is generally quite recoverable, and may be sufficient to overcome some bug signatures.

In some cases, it may be a side effect of the perturbation action which actually thwarts the bug, rather than the direct action of the perturbation itself. For example, a forced parity error may not directly avoid the bug, but the corrective action which the system takes to fix a parity error may cause the bug's signature to be avoided or for its undesirable effects to be nullified or corrected.

Electrical perturbations, such as injecting noise, overdriving a signal, or asserting an illegal signal voltage, are generally much less desirable than protocol perturbations, but may be appropriate in some systems or with some buses. For example, some data transceivers detect immediate logic values and recognize the presence of contention, which can result in retries.

In the mode in which the computer system is an Intel Architecture system, the perturbation may include asserting or deasserting any of these signals, among others: HIT#, HITM#, AERR#, BNR#, BPRI#, BINIT#, BERR#, INIT#, RESET#, and DBSY#.

Finally, the bus patcher may include any conventional means for enabling and disabling its circuitry. For simplicity, connection is not shown between the enable/disable unit and the other units. Those skilled in the art will appreciate that this unit allows external logic to power down the bus patcher, so that the bus patcher enters a low-power state when not needed. In this mode, the enable/disable unit powers the bus patcher back up in response to the external enable signal. Alternatively, the enable/disable unit could be internally triggered without the need for any external input signal, to automatically put the bus patcher into a sleep mode when not in use. In this mode, the enable/disable unit is adapted to detect when the bus patcher is again needed, in any conventional manner understood by those skilled in the art.

Figure 2:
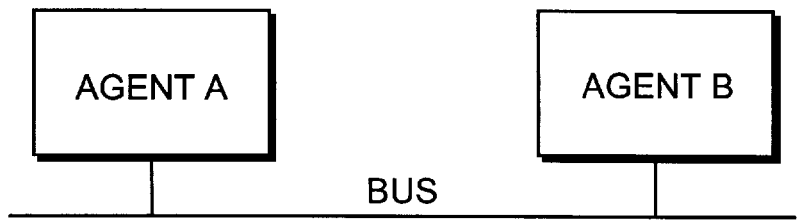
FIG. 2 illustrates a simplified computer system including two agents coupled to a bus, according to the prior art.

FIG. 2 illustrates a computer system according to the prior art, in which a first agent (A) and a second agent (B) are coupled to communicate with each other over a bus. FIG. 2 shows two agents for simplicity only. It will be appreciated that any number of agents may be present in any given computer system. In various embodiments, none of which is particularly shown in FIG. 2, an agent may be a processor, or a co-processor, or a signal processor, or a bus bridge such as one between a processor bus and a bus which is used to connect add-in boards, for example a PCI bus or ISA bus, or a memory controller, or a cache controller, or a direct memory access device, or other such agents.

Figure 3:
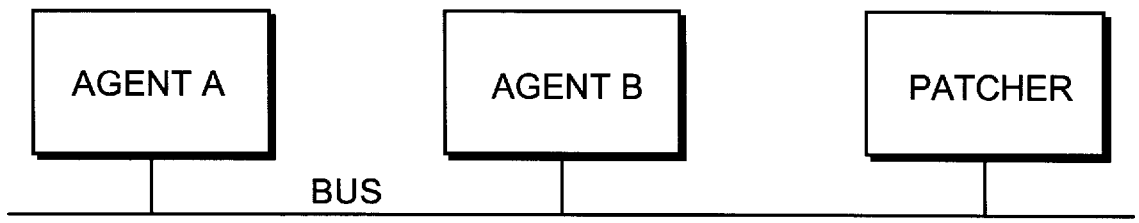
FIG. 3 illustrates a computer system enhanced to include the bus patcher, in which the bus patcher is coupled directly to the bus.

FIG. 3 illustrates a simple system as in FIG. 2, but with the addition of the bus patcher. As shown in FIG. 3, the bus patcher may be coupled directly and independently to the same bus to which the other agents are coupled. In this mode, the patcher is a stand-alone component with respect to the other agents.

Alternatively, FIG. 3 can be understood to illustrate a system which is substantially within the confines of a single chip such as a microprocessor, in which the various agents are simply the various internal units of the chip and the bus is an internal bus over which those units communicate with each other. In this alternative embodiment, it is not necessary that the bus be visible to the outside world.

Figure 4:
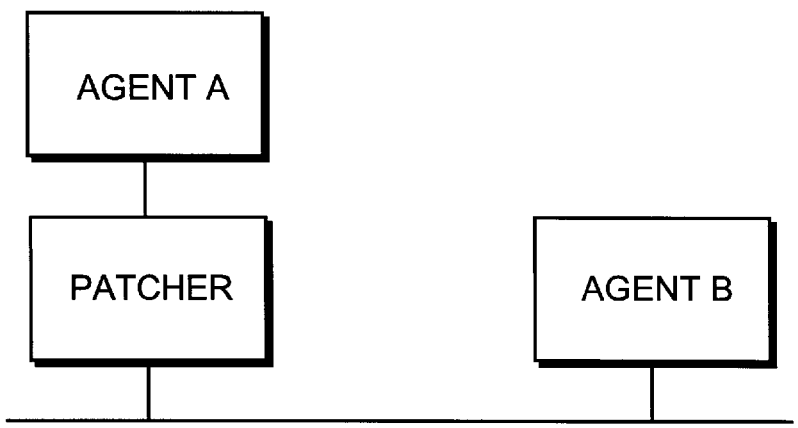
FIG. 4 illustrates a computer system in which the bus patcher is inserted between an agent and the bus.

FIG. 4 illustrates a somewhat different embodiment, in which the bus patcher is interposed between an agent and the bus. It is desirable, but not required, that the agent which is interposed by the bus patcher be the one which either causes the bug or fails as a result of the bug.

Figure 5:
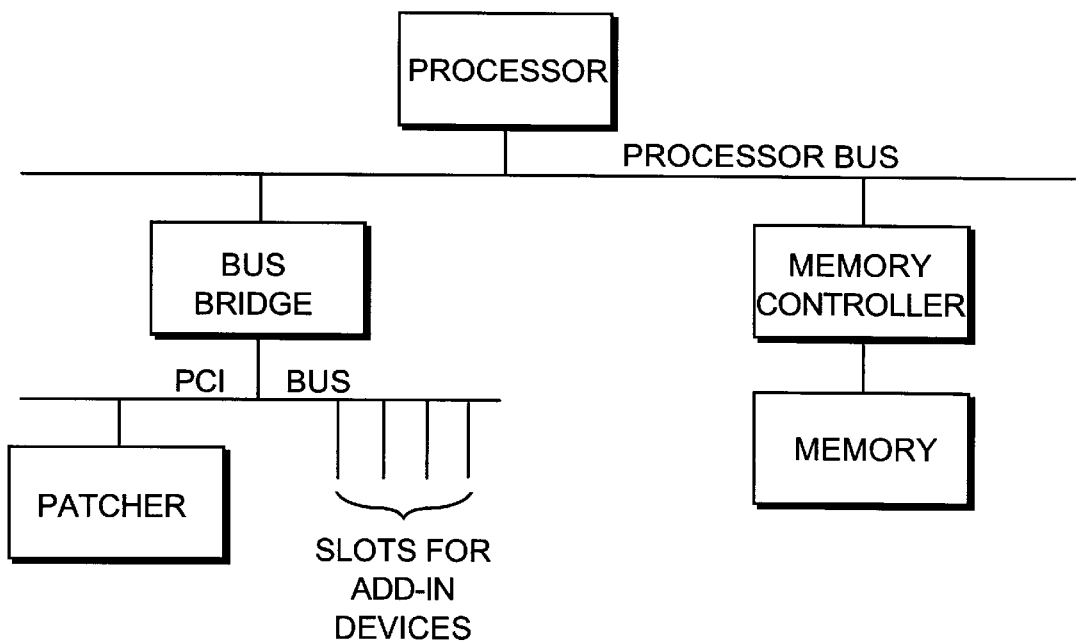
FIG. 5 illustrates a computer system in somewhat more detail, illustrating a processor, bus bridge, and memory controller as agents coupled to the bridge, and further illustrates that the bus patcher can be used on a bus other than the main processor or system bus.

FIG. 5 illustrates in somewhat more detail a particularly useful embodiment of the invention, in which the agents include a processor, a bus bridge, and a memory controller with its associated memory. In one such embodiment, the processor is a Pentium® Pro processor from Intel Corporation, and the bus bridge bridges between the processor bus and a PCI bus.

FIG. 5 further illustrates that the bus patcher need not be coupled directly to the processor bus. In the embodiment shown, the bus patcher is coupled to the PCI bus to patch bugs occurring on that bus, such as in communications between a PCI add-in card (not shown) and either another PCI add-in card (not shown) or the PCI bridge chip. In another embodiment (not shown), the bus patcher could be coupled to the bus between the memory controller and the memory, to patch bugs occurring there. In yet another embodiment (not shown), the bus patcher could be coupled to more than one bus, such as a processor bus and PCI bus, to patch bugs in a bus bridge also coupled to those buses.

Figure 6:
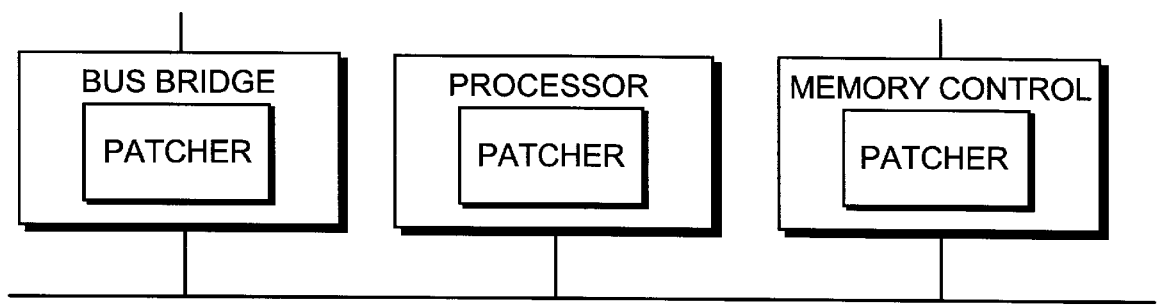
FIG. 6 illustrates that the bus patcher may be resident in a variety of system agents.

FIG. 6 illustrates that the patcher need not be a stand-alone device. Rather, the bus patcher may be incorporated directly into one or more other agents. It is anticipated that the bus patcher will generally take a very small area of any agent chip, and that it may therefore be advantageously included in an agent, or even in all agents, as a matter of course, "just in case". In this mode, it may be desirable to equip the patcher with means (not shown) for enabling and disabling the patcher, so the patcher will take no action and consume no power unless it is needed and enabled. Any suitable, conventional enabling means may be used for this purpose.

FIG. 6 further illustrates that the functionality of a single patcher might be distributed among various agents. For example, the protocol watcher might be included in the processor, since the processor will generally be the component which defines the bus protocol to which all other agents will be adapted. The perturber might be included in the bus bridge, if that is the agent subject to failure upon occurrence of a bug to be patched. The state machine may be located wherever it is convenient. In such a distributed embodiment, the system bus itself may be used for signaling between the elements of the bus patcher. In some instances, the very fact that the system bus will be used for this traffic may obviate the need for a perturber; the inter-element signaling itself may be sufficient perturbation to overcome the bug signature. Alternatively, a dedicated patcher bus (not shown) may couple the patcher components together.

It will be appreciated that the choice of which of these embodiments, of where to connect the bus patcher, may be determined in part by the nature of the bus itself. For example, a wired-or bus may advantageously lend itself for use with the embodiments of FIG. 3. A wired-or bus is advantageous because it permits any independent agent—including an agent which the system was not specifically designed to accommodate, such as a bus patcher—to assert a signal which will be recognized by all other agents on the bus.

Figure 7:
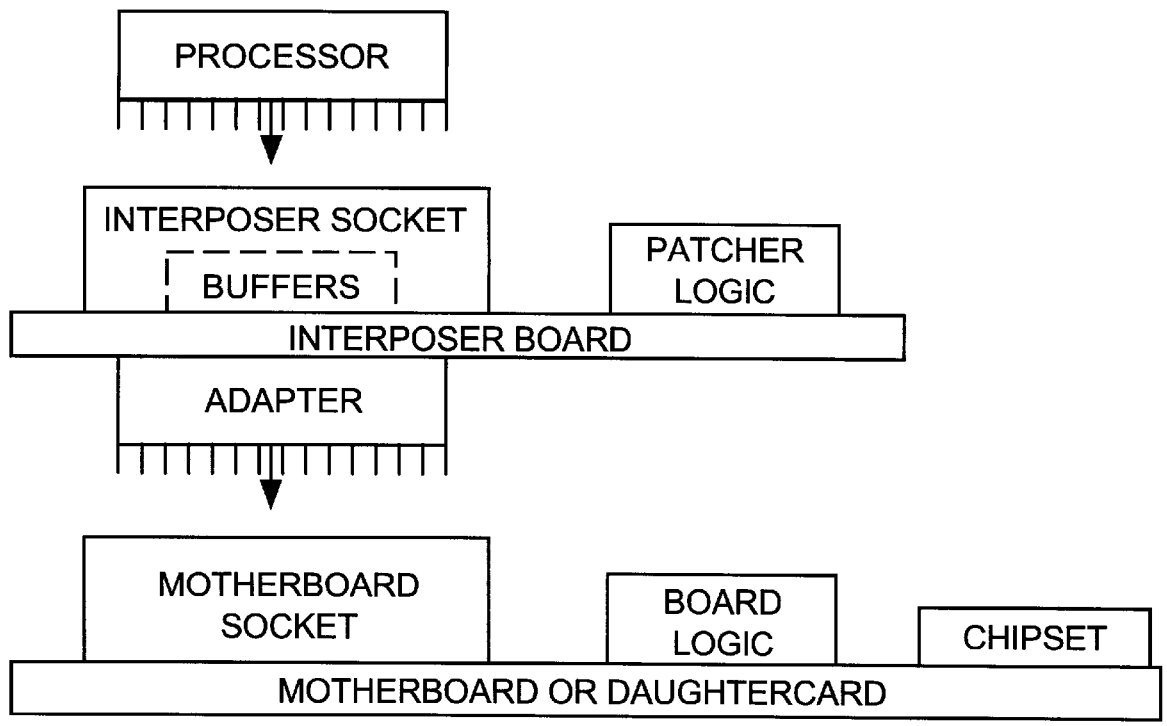
FIG. 7 is a side view of a physical implementation of the bus patcher, in which the bus patcher resides on an interposer board which is installed between an agent, such as a processor, and that agent's customary socket on the motherboard or daughtercard.

FIG. 7 shows one possible physical implementation of the bus patcher for use in a computer system as shown in FIG. 4, in which the bus patcher is interposed between an agent and the bus to which that agent would otherwise be coupled. FIG. 7 illustrates it as the processor which is interposed by the bus patcher, but it will be understood that other agents may be so interposed.

Rather than being connected directly to its motherboard or processor daughtercard socket for connection to the chipset and other board logic, the processor is connected to an interposer socket on an interposer board. An adapter then connects the interposer board to the motherboard or daughtercard. In the embodiment shown, the processor is socketed, but it will be appreciated that the interposer technique may be adapted for use with other well-known mounting techniques.

The bus patcher is coupled to the interposer board and electrically coupled to the interposer socket and the adapter by means not shown but understood in the art. In the embodiment shown, the receiver(s) and/or driver(s) of the bus patcher, collectively called buffers, may be physically removed from the logic portions of the patcher. In one mode, the buffers, or a subset of them, may be located beneath the interposer socket or within an outer pin perimeter (not shown in this side view) of the interposer socket. This is especially suitable where the processor is an Intel Pentium® Pro processor, which is packaged with its level two cache in a dual cavity pin grid array package having pins around its perimeter but not directly beneath the center portion of the package.

Figure 8:
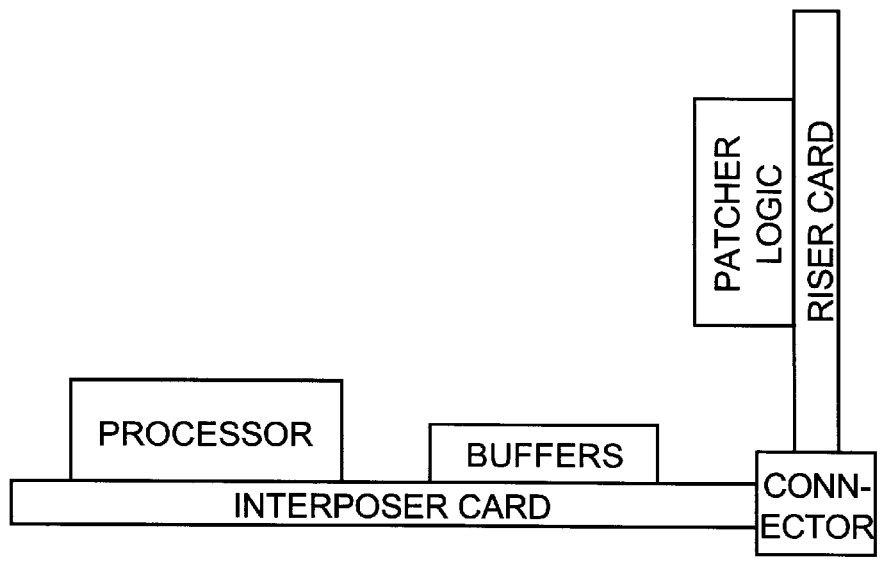
FIG. 8 is a modified physical embodiment in which the interposer includes a plurality of connected cards.

FIG. 8 illustrates an alternative mode of the construction of the interposer board, in which the processor or other agent is coupled to the main interposer card and at least portions of the bus patcher are coupled to a separate card such as a riser card, which is coupled to the main interposer card by a connector such as an edge connector. Optionally, some elements of the bus patcher, such as the buffers, may be on the main interposer card. This will typically offer better noise, decoupling, and other electrical effects.

This mode offers several distinct advantages. The particular computer system into which the bus patcher is to be inserted may have space restraints which would prevent the use of a unitary interposer. Also, the use of a separate, couplable card for portions of the bus patcher, such as the logic or programming portions especially, may enable the use of a single main interposer card with a variety of logic add-ins simply by coupling different riser cards.

Although the riser card is illustrated as being mounted at an angle with respect to the main interposer card, it will be appreciated that this is an optional mode. They could be coupled in any suitable manner.

FIG. 8 is simplified with respect to what is shown in FIG. 7, for clarity and ease of understanding, and illustrates the processor and buffers coupled to the interposer card, the patcher logic coupled to the riser card, and the riser card and interposer card joined by a connector.

Figure 9:
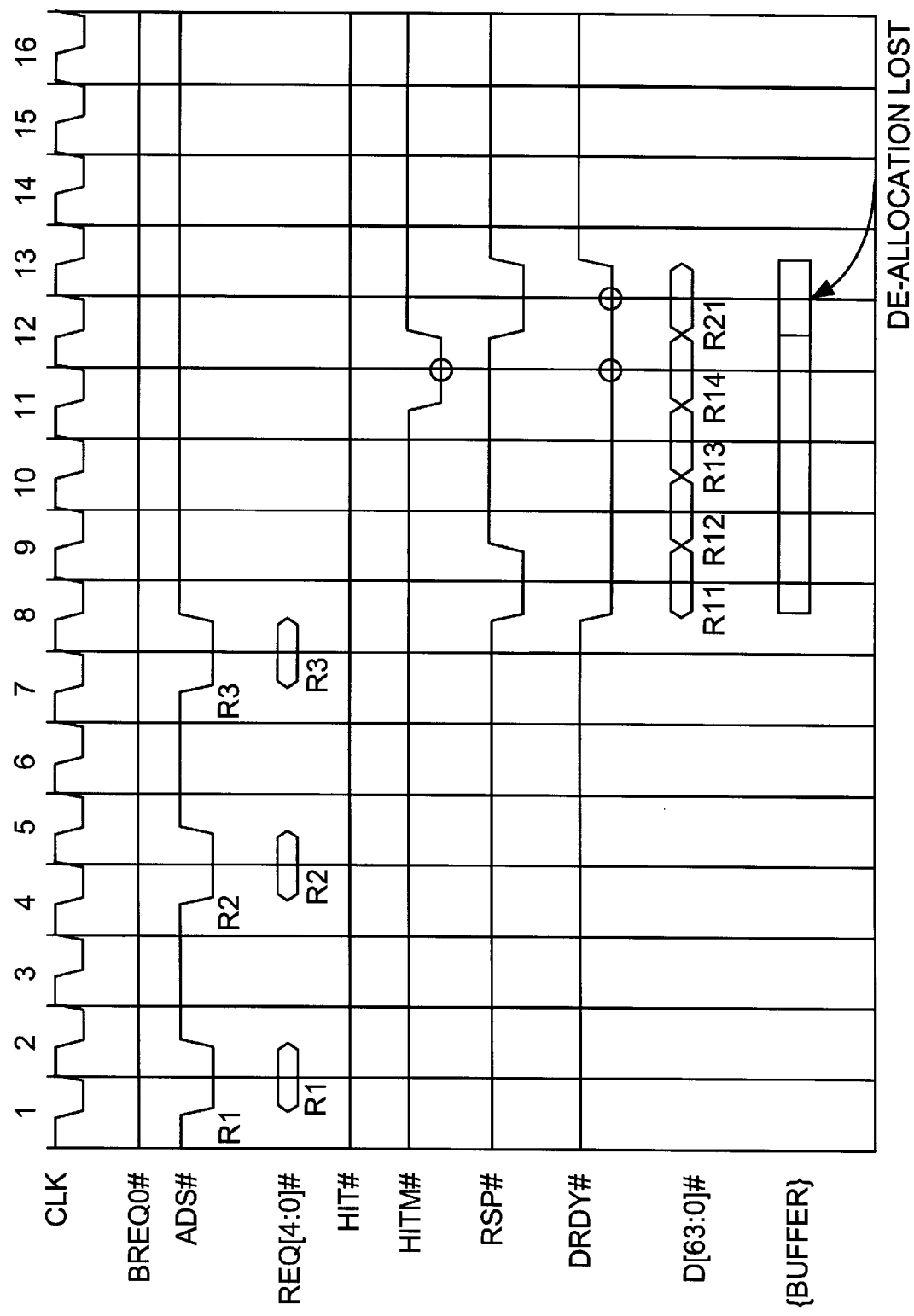
FIG. 9 is a timing diagram illustrating the behavior of various signals according to an exemplary bug signature, which will cause an error in the system.

FIG. 9 illustrates one exemplary bug which may occur in a system. For explanatory purposes, the system described is based on an Intel Architecture microprocessor such as the Pentium® Pro processor.

The timing diagram describes three read transactions, of which R1 is a read line transaction, R2 is a read partial line transaction, and R3 is a read line transaction issued on the bus by a bus agent. The data return for R1 occurs at R11–14, and the data return for R2 occurs at R21.

The bug signature for the illustrated bug is a bug in the buffer deallocation policy in the bus agent (chipset) which is returning the data, which bug occurs under the following conditions: 1) the last data transfer R14 for read transaction R1 and the snoop phase for read transaction R3 with HITM# assertion occur in the same clock (11), which causes a request for buffer deallocation for read transactions R1 and R3, and 2) the single data transfer R21 occurs in the immediately next clock (12), which causes a buffer deallocation to occur for transaction R2. This error occurs because the logic was not designed to handle three deallocations in two consecutive clocks. As a result, the deallocation for transaction R2 gets lost, and when the same buffer subsequently gets allocated for a later transaction, that transaction receives incorrect data.

Figure 10:
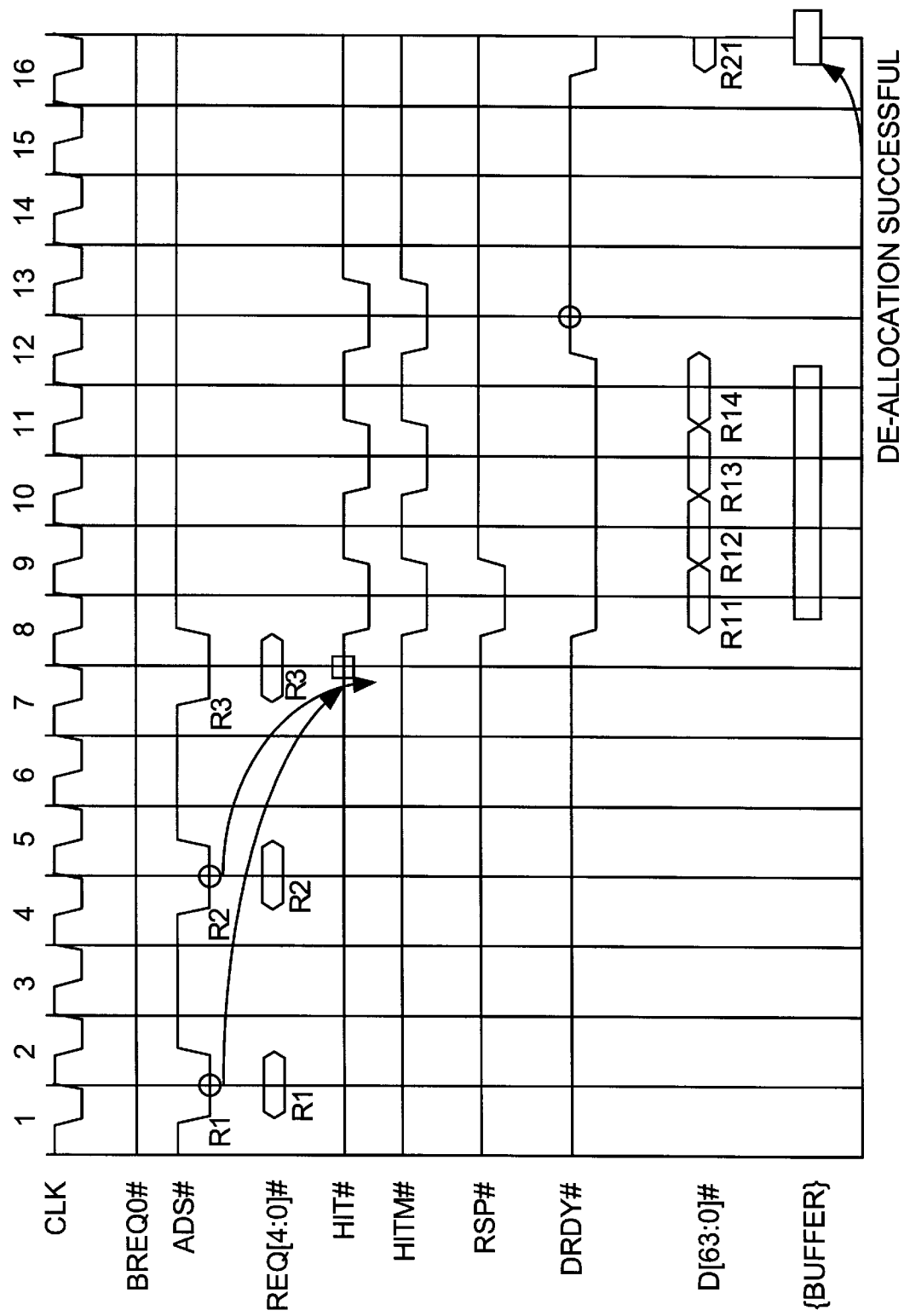
FIG. 10 is a timing diagram illustrating how the behavior of certain ones of those signals may be modified by the bus patcher to avoid the bug.

FIG. 10 illustrates the use of the bus patcher to overcome the bug of FIG. 9. Because the bug only occurs when three buffer deallocations occur in two consecutive clocks, and because this requires two independent data transfer completions such as R14 and R21 to occur in two consecutive clocks, the bug signature can be avoided by delaying R21 by one or more clocks. One patch which avoids the bug is to delay the snoop phase completion of transaction R2. The Pentium® Pro processor bus protocol allows an independent bus agent—which the bus patcher is—to assert snoop stall on any transaction on the bus.

In this instance, the bus patcher's state machine is programmed to detect the back-to-back sequence of a read line followed immediately by a read partial, and the perturber is programmed to assert snoop stall (by asserting HIT# and HITM# together in the snoop phase) for the read partial until the data transfer for the read line is complete. This guarantees that R21 will always be delayed from R14 by at least one clock, thereby avoiding the bug by preventing its signature from occurring.

As an alternative to the perturber using snoop stalling, the perturber could assert the BNR# signal (not shown) (a signal which blocks the next request) upon recognition of a bug signature involving back-to-back sequences of three transactions, causing a stall in the issuance of the third transaction. BNR# is then released when the bug signature's window of opportunity expires. For bugs which require a back-to-back sequence of only two transactions, BNR# can be used to throttle instruction issuance, with BNR# being deasserted upon each transaction which is not the first in the back-to-back sequence of the bug signature.

Because HIT#, HITM#, and BNR# are wired-or signals in the exemplary system, they are excellent candidates for use in the bus patcher's perturbation scheme. If wired-or glitch protocol restrictions are relaxed and the bus is operated at a slower frequency, additional signals become viable candidates. For example, deassertion of BPRI# may be delayed after completion of the last transaction from a bus bridge agent, to avoid any bugs associated with change of bus ownership between a priority agent and a symmetric agent. Some transaction types only occur from a bridge agent. If BPRI# deassertion delay will prevent the last transaction from the bridge agent from being pipelined with another transaction from a symmetric agent.

As another example, extension of DBSY# deassertion extends the data transfer bus occupation from one agent, preventing another agent from pipelining the next data transfer immediately after it.

As another example, assertion of AERR# causes a transaction to be reissued once. This technique can be used in a very limited manner, to get exactly one more retry of a given transaction. This may prove useful, for example, as a preliminary (although not guaranteed successful) attempt at patching a bug whose guaranteed patch has significant drawbacks such as serious performance degradation or the like.

As yet another example, the bus patcher has been used to patch a bug resulting from a Pentium® Pro processor chipset's memory controller data buffer deallocation problem, in which the silicon failed when read-after-write access was enabled. The patch for that bug is illustrated in Table 1 in pseudo-code format.

TABLE 1

Example Patch if Snoop Stall then
{ if ReqA:MEM INV then
    { Fire BNR# for one clock
      if ReqB:LEN=00 then
        continue to stall BNR# until Snoop Stall completed
    }
    wait 16 additional clocks
}

These examples above have been given to further educate the reader concerning the use of the patcher. The reader will understand that this is by no means a comprehensive list, and that the patcher is capable of myriad other patches on a wide variety of bus, processor, and computer architectures.

Please refer again to FIG. 1. In embodiments where the patcher is practiced e.g. on-chip, in which the patcher is not actually coupled to a bus, but is instead coupled directly to one or more functional units, the perturbation may simply mean the patcher sending a signal to one or more units, causing them to take some predefined action.

In an alternative embodiment, the bus patcher does not include a perturber. Rather than attempting to patch a bug, the bus patcher takes some other action in support e.g. of chip or system validation. For example, it may include a counter (not shown) instead of a perturber. This embodiment may be particularly useful for verifying that previously identified and supposedly fixed bugs no longer occur. That is, it may be used to validate that a stepping actually fixed the bug. If a particular bug was known to cause an observable error, such as a system hang, in pre-fix systems, and if the counter verifies that the bug signature has been observed one or more times, and the bug has not been observed, then it can be stated with a higher degree of confidence that the bug was, in fact, fixed.

While the invention has been described with reference to particular embodiments as illustrated by the particular drawings herein, and with particular reference to Intel Architecture processor bus signals, those skilled in the art will appreciate that the invention may be practiced in various other configurations and with various other buses, which are within the scope of the teachings of this disclosure.

We claim:

1. An apparatus comprising:

a bus;

a first agent in a plurality of agents coupled to the bus;

a second agent in the plurality of agents coupled to the bus that communicates with the first agent according to a bus protocol;

one or more additional agents in the plurality of agents coupled to the bus; and a patcher coupled to the bus for monitoring a communication on the bus from the second agent to the first agent to identify an event which would cause an error in any agent in the plurality of agents coupled to the bus, wherein the event is caused by a set of circumstances that independently comprise valid information, the patcher for modifying the communication such that the event is avoided.

2. The apparatus of claim 1 wherein the patcher comprises:

programmable means for storing a bug signature of the event according to which the patcher identifies the event.

3. The apparatus of claim 2 wherein the programmable means has a bug signature stored therein.

4. The apparatus of claim 2 wherein the patcher further comprises:

a protocol watcher coupled to the bus and to the programmable means for storing; and a perturber coupled to the programmable means for storing and to the bus.

5. The apparatus of claim 4 wherein the patcher comprises a unitary, stand-alone component.

6. The apparatus of claim 4 wherein two or more components of the patcher are distributed among two or more agents.

7. The apparatus of claim 4 wherein the protocol watcher includes programmable means for storing the protocol.

8. The apparatus of claim 7 wherein the programmable means of the protocol watcher has the protocol stored therein.

9. The apparatus of claim 4 wherein the perturber includes programmable means for storing a perturbation to be performed responsive to identification of the bug signature by the programmable means for storing.

10. The apparatus of claim 9 wherein the programmable means for storing a perturbation has stored therein a perturbation.

11. The apparatus of claim 2 wherein the programmable means for storing comprises a state machine.

12. The apparatus of claim 1 wherein the patcher and one of the agents comprise a unitary device coupled to the bus over a single connection.

13. The apparatus of claim 1 further comprising a plurality of patchers.

14. The apparatus of claim 1 wherein one of the agents is coupled to the bus, and the other is coupled to the bus indirectly through the patcher.

15. The apparatus of claim 14 wherein the one of the agents is a processor and the other is a chipset.

16. The apparatus of claim 1 wherein the patcher is coupled to the bus indirectly through one of the agents.

17. The apparatus of claim 16 wherein the one of the agents is a bus bridge between the bus and a peripheral bus, and the patcher is coupled to the one of the agents over the peripheral bus.

18. The apparatus of claim 17 wherein the bus bridge is for bridging between a Pentium® Pro processor bus and a PCI bus.

19. The apparatus of claim 1 wherein at least a portion of the bus comprises a wired-or bus.

20. The apparatus of claim 1 wherein the apparatus comprises a single monolithic chip and wherein the bus patcher is for patching bugs on an internal bus within that chip.

21. An apparatus comprising:

a protocol watcher adapted to observe bus traffic according to a bus protocol;

a state machine coupled to the protocol watcher to detect the occurrence of a bug signature in the bus traffic; and a perturber coupled to the state machine for disrupting the bug signature to prevent occurrence of an error event.

22. The apparatus of claim 21 wherein the protocol watcher includes first programmable means for storing the bus protocol.

23. The apparatus of claim 22 wherein the first programmable means has the bus protocol stored therein.

24. The apparatus of claim 21 wherein the state machine includes second programmable means for storing at least one bug signature which the state machine detects.

25. The apparatus of claim 24 wherein the second programmable means is further for storing a plurality of bug signatures which the state machine detects.

26. The apparatus of claim 25 wherein the second programmable means has stored therein at least one bug signature.

27. The apparatus of claim 21 wherein the perturber includes third programmable means for storing at least one perturbation.

28. The apparatus of claim 27 wherein the third programmable means is further for storing a plurality of perturbations.

29. The apparatus of claim 27 wherein:

the apparatus further comprises second programmable means for storing a plurality of bug signatures which the state machine detects; and the third programmable means is further for storing one perturbation for each bug signature stored in the second programmable means.

30. The apparatus of claim 29 wherein:

the second programmable means has at least one bug signature stored therein; and the third programmable means has at least one perturbation stored therein.

31. The apparatus of claim 21 further comprising:

means for enabling and disabling the apparatus.

32. A bus patcher comprising:

an interposer board;

buffers for coupling the interposer board to a bus; and patcher logic coupled to the buffers and including,
- a protocol watcher adapted to observe bus traffic according to a bus protocol,
- a state machine coupled to the protocol watcher to detect the occurrence of a bug signature in the bus traffic, and
- a perturber coupled to the state machine for disrupting the bug signature to prevent occurrence of an error event.

33. The bus patcher of claim 32 further comprising:

means for interposing the bus patcher between an electronic device and an electronic system adapted to receive the electronic device.

34. The bus patcher of claim 33 wherein the means for interposing comprises:

an interposer socket coupled to the interposer board and to the buffers and adapted to receive the electronic device; and an adapter for coupling to the electronic system.

35. The bus patcher of claim 34 wherein the patcher logic is mounted to the interposer board.

36. The bus patcher of claim 32 further comprising:

a second card to which the patcher logic is coupled; and means for coupling the second card to the interposer card.

37. The bus patcher of claim 36 wherein the means for coupling the second card to the interposer card couples them at a substantially right angle relative to each other.

38. A method of avoiding a bug in a computer system in which a first agent communicates to a second agent over a bus, the method comprising the steps of:

observing a bug signature in a communication on the bus; and perturbing the communication to prevent occurrence of a bug event which would otherwise occur according to the bug signature.

39. An apparatus comprising:

a first electronic component in which modifications have been made to correct a bug having a bug signature, which bug caused an error in communications of the apparatus over a bus; and a second electronic component including,
- a protocol watcher for observing the communications according to a protocol of the bus, and
- a state machine for observing the bug signature and for indicating that the bug signature has been observed, the occurrence of the bug signature without occurrence of the error indicating that the error has been successfully corrected.

40. A method of analyzing functional correctness of a first electronic device in communication with a second electronic device over a bus, the method comprising the steps of:

identifying a first bug in a first communication over the bus;

storing, into a programmable storage means of a patcher, a first bug signature of the first bug;

repeating the first communication;

detecting the first bug signature;

responsive to the detecting step, perturbing the first communication to avoid the first bug; and verifying that the first bug did not occur in the perturbed first communication.

41. The method of claim 40 further comprising the step of:

subsequent to the verifying step, identifying a second bug which would have been hidden by the first bug but for the perturbing step.

42. The method of claim 41 further comprising the step of:

subsequent to one or more iterations of finding bugs hiding behind blocking bugs, stepping the first electronic device to correct a blocking bug and a bug hidden by the blocking bug.

* * * * *